US008331859B2

(12) United States Patent
Maekawa

(10) Patent No.: US 8,331,859 B2
(45) Date of Patent: Dec. 11, 2012

(54) COMMUNICATION APPARATUS

(75) Inventor: Itaru Maekawa, Tokyo (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 12/757,680

(22) Filed: Apr. 9, 2010

(65) Prior Publication Data

US 2010/0267336 A1 Oct. 21, 2010

(30) Foreign Application Priority Data

Apr. 20, 2009 (JP) ................................ P2009-102507

(51) Int. Cl.
*H04B 5/00* (2006.01)
*H01Q 1/38* (2006.01)

(52) U.S. Cl. ............... 455/41.1; 333/24 R; 343/700 MS

(58) Field of Classification Search ................. 455/41.1, 455/41.2, 41.3, 90.2, 90.3; 333/24 R, 238, 333/246; 343/700 MS, 741, 866
See application file for complete search history.

(56) References Cited

U.S. PATENT DOCUMENTS 7,750,851 B2 * 7/2010 Washiro ................. 343/700 MS
7,853,208 B2 * 12/2010 Washiro ....................... 455/41.1
7,925,235 B2 * 4/2011 Konya et al. ................. 455/41.1
8,008,985 B2 * 8/2011 Washiro ...................... 333/24 R
2008/0076351 A1 3/2008 Washiro

FOREIGN PATENT DOCUMENTS

JP 2007-028302 2/2007
JP 2007-079845 3/2007
JP 2008-099236 4/2008

OTHER PUBLICATIONS

"Transfer Jet," http://www.transferjet.org/en/index.html, 1 page, (2009).

* cited by examiner

*Primary Examiner* — Quochien B Vuong
(74) *Attorney, Agent, or Firm* — Finnegan, Henderson, Farabow, Garrett & Dunner LLP

(57) ABSTRACT

A communication apparatus includes: a communication circuit section that processes a high-frequency signal for transferring data; a transfer path for the signal connected to the circuit section; a ground; a coupling electrode supported opposite and away in height from the ground; a resonance section that increases a current flowing into the electrode via the path; and a main body housing that assumes a plurality of placement postures and houses the respective components, one end surface of the housing serving as a reading surface in which the electrode is disposed offset from a center of the reading surface. An infinitesimal dipole is formed from a line segment connecting between a center of a charge in the electrode and a center of an image charge in the ground. The signal is transferred toward a communication partner disposed oppositely to form an angle of substantially 0 degrees with a direction of the dipole.

3 Claims, 8 Drawing Sheets

COMMUNICATION APPARATUS

BACKGROUND OF THE INVENTION

1. Field of the Invention

The present invention relates to a communication apparatus that performs mass data transfer in a short range through an extremely low-power UWB communication scheme that uses a high-frequency wide band, and in particular to a communication apparatus that secures a horizontal communicable range in extremely low-power UWB communication that utilizes electric field coupling.

2. Description of the Related Art

Contactless communication is widely utilized as a medium for authentication information or value information on electronic money or the like. For example, NFC (Near Field Communication) developed by Sony Corporation and Royal Philips Electronics is an RFID standard defining the specifications of an NFC communication apparatus (reader/writer) that may communicate with each of a type-A IC card, a type-B IC card, and a FeliCa IC card complying with ISO/IEC 14443. NFC enables contactless bidirectional communication that uses a 13.56 MHz band and that is performed in proximity (within a range of 0 to 10 cm) through an electromagnetic induction scheme. Recently, contactless communication systems have been further applied to mass data transfer such as downloading and streaming of video and music data. Mass data transfer is preferably accomplished with a single user operation and completed in an access time that is perceptually as short as the time necessary for authentication and billing processes in the past. Therefore, a high communication rate is demanded.

A general RFID standard defines contactless bidirectional communication that uses a 13.56 MHz band and that is performed in proximity (within a range of 0 to 10 cm) on the basis of electromagnetic induction as a primary principle. The contactless bidirectional communication provides a communication rate of only about 106 kbps to 424 kbps. In contrast, TransferJet which uses an extremely low-power UWB (Ultra Wide Band) signal may be mentioned as a proximity wireless transfer technology applicable to high-speed communication (see Japanese Unexamined Patent Application Publication No. 2008-99236 and www.transferjet.org/en/index.html (as of Mar. 23, 2009), for example). The proximity wireless transfer technology (TransferJet) is basically a scheme for transferring a signal utilizing electric field coupling. A communication apparatus for TransferJet is formed of a communication circuit section that processes a high-frequency signal, a coupling electrode disposed away from a ground at a certain height, and a resonance section that efficiently supplies the high-frequency signal to the coupling electrode.

A compact reader/writer module for NFC communication suitable for embedded application has already been developed and manufactured, and is available for installation in various devices. Meanwhile, a cradle may be mentioned as an instrument that provides the above proximity wireless transfer function to existing information devices. For example, connecting a cradle incorporating a high-frequency coupler to the main body of a personal computer through a USB (Universal Serial Bus) enables data transmission and reception through proximity wireless transfer between the personal computer and a cellular phone or a digital camera incorporating the proximity wireless transfer function.

For example, a cradle device including a card reader/writer is proposed. When a camera-equipped portable device incorporating a contactless IC card is attached to the cradle device, the card reader/writer reads and writes image data through wireless communication with the contactless IC card (see Japanese Unexamined Patent Application Publication No. 2007-79845, for example). Further, a cradle that performs wireless communication, such as Bluetooth communication, with a digital camera is also proposed (see Japanese Unexamined Patent Application Publication No. 2007-28302, for example).

In the past, it was common to provide a cradle as a standard accessory or an optional accessory dedicated to each model. However, respective family members often own different models of products, and thus there tend to be a large number of cradles in home. Thus, in order to avoid that, it is considered to be preferable to introduce the concept of Universal Design and provide a cradle common to a plurality of models.

However, portable information devices such as cellular phones and digital cameras are varied in design and operability among models, and thus the shape of the main body of the devices and the installation position of the high-frequency coupler within the devices are not fixed. Therefore, even if a cellular phone is placed on a desktop (or on the floor) in the same posture and a cradle is placed adjacent to the cellular phone, the coupling electrode of the high-frequency coupler may not face the reading surface of the cradle appropriately.

For example, a cellular phone may be provided with a proximity wireless transfer function through the medium of a memory card. In this case, as shown in FIGS. 10A and 10B, the position of a memory card slot may be different among models. Thus, even if the main body of the cellular phone is placed in the same posture and approximated to the cradle, the same communication quality may not be obtained because the position of the high-frequency coupler may be different.

Proximity wireless transfer that utilizes extremely low-power UWB has a communication range of about 2 to 3 cm. The high-frequency coupler does not have polarization characteristics, and thus has a communicable range substantially in the shape of a hemispherical dome having substantially the same extension in the vertical direction and in the horizontal direction. On the other hand, assuming that the height and the thickness of the portable information device are respectively about 5 cm and 1 cm, the difference in height of the coupling electrode due to the difference in design among models or the difference in posture of the device placed on a desktop may be as large as about 5 cm. That is, variations in height of the coupling electrode according to the placement posture of the communication partner device may exceed the communication range supported by the proximity wireless transfer technology.

SUMMARY OF THE INVENTION

It is therefore desirable to provide an advanced communication apparatus that allows mass data transfer in a short range through an extremely low-power UWB communication scheme that uses a high-frequency wide band.

It is also desirable to provide an advanced communication apparatus that secures a sufficient horizontal communicable range in proximity wireless transfer that utilizes an extremely low-power UWB but that does not use polarization characteristics.

It is further desirable to provide an advanced communication apparatus that is connectable, like a cradle, to the main body of an information device and that secures a horizontal communicable range that tolerates variations in height of a coupling electrode according to the placement posture of the communication partner device.

In view of the foregoing, according to a first embodiment of the present invention, there is provided a communication apparatus including: a communication circuit section that processes a high-frequency signal for transferring data; a transfer path for the high-frequency signal connected to the communication circuit section; a ground; a coupling electrode supported opposite the ground and away in height from the ground by a distance that is ignorable with respect to a wavelength of the high-frequency signal; a resonance section that increases a current flowing into the coupling electrode via the transfer path; and a main body housing that assumes a plurality of placement postures and that houses the respective components, one end surface of the main body housing serving as a reading surface in which the coupling electrode is disposed at a position offset from a center of the reading surface, in which an infinitesimal dipole is formed from a line segment connecting between a center of a charge accumulated in the coupling electrode and a center of an image charge accumulated in the ground, and the high-frequency signal is transferred toward a communication partner disposed oppositely so as to form an angle of substantially 0 degrees with a direction of the infinitesimal dipole.

According to a second embodiment of the present invention, the communication apparatus according to the first embodiment further includes: a communication interface control section that performs data transmission and reception with an external device in accordance with a predetermined communication protocol; and a control section that controls operation of the entire apparatus which includes communication operation performed by the communication circuit section and the communication interface control section.

According to a third embodiment of the present invention, in the communication apparatus according to the first embodiment, the housing substantially has a shape of a cube, one end surface of the cube serves as a reading surface in which the coupling electrode is disposed at a position offset from a center of the reading surface, and the cube assumes different placement postures by changing a ground contact surface of the cube.

According to the present invention, it is possible to provide an advanced communication apparatus that allows mass data transfer in a short range through an extremely low-power UWB communication scheme that uses a high-frequency wide band.

According to the present invention, it is also possible to provide an advanced communication apparatus that secures a sufficient horizontal communicable range in proximity wireless transfer that utilizes an extremely low-power UWB but that does not use polarization characteristics.

According to the present invention, it is further possible to provide an advanced communication apparatus that is connectable, like a cradle, to the main body of an information device and that secures a horizontal communicable range that tolerates variations in height of a coupling electrode according to the placement posture of the communication partner device.

According to the first embodiment of the present invention, it is possible to utilize the effect of changes in position of the coupling electrode within the reading surface according to changes in placement posture of the main body housing by disposing the coupling electrode in the reading surface at a position offset from the center of the reading surface. As a result, it is possible to secure a horizontal communicable range that tolerates variations in height of the coupling electrode according to the placement posture of a portable information device serving as the communication partner.

The communication apparatus according to the second embodiment of the present invention may be used as a cradle that provides a proximity wireless transfer function to an information device such as a personal computer, and that further secures a horizontal communicable range that tolerates variations in height of the coupling electrode according to the placement posture of a portable information device serving as the communication partner.

According to the third embodiment of the present invention, it is possible to provide a plurality of placement postures by changing the ground contact surface of the main body of the cradle having a substantially cubic shape. That is, it is possible to expand the horizontal communicable range by changing the ground contact surface of the main body of the cradle to rotate the reading surface about its center and thus change the position of the coupling electrode within the reading surface.

Further objects, characteristics, and advantages of the present invention will become apparent upon reading the following detailed description of an embodiment of the present invention given with reference to the accompanying drawings.

DESCRIPTION OF THE PREFERRED EMBODIMENTS

An embodiment of the present invention will be described in detail below with reference to the drawings.

First, the operating principle of proximity wireless transfer through an extremely low-power UWB communication scheme is described.

Figure 1:
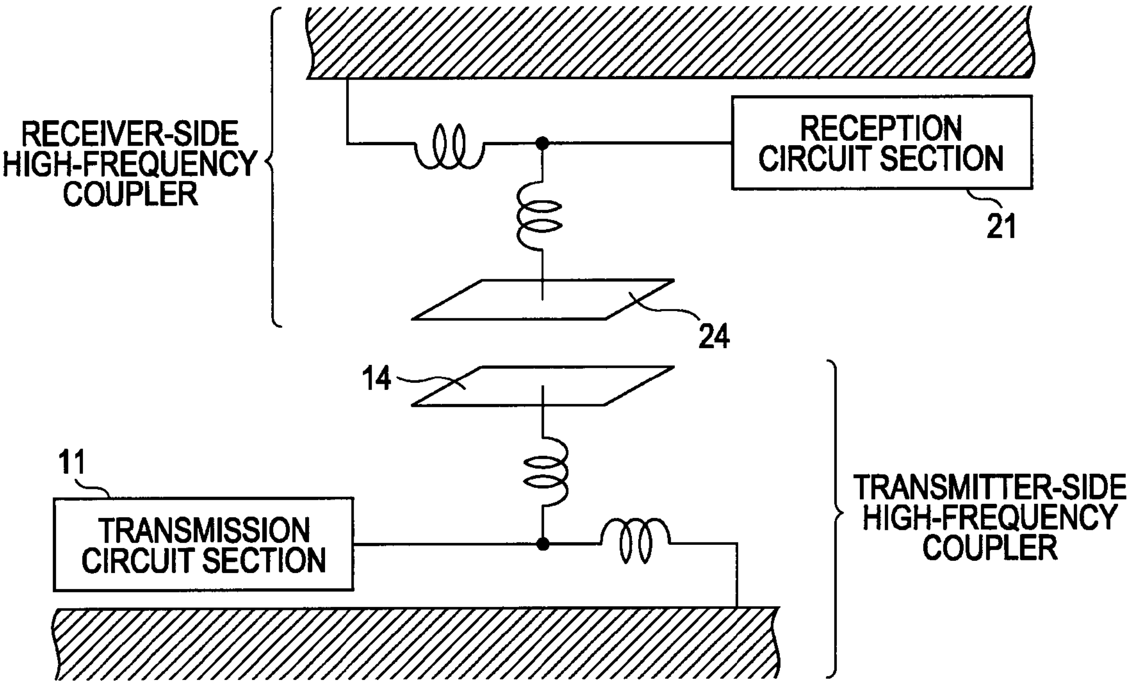
FIG. 1 schematically shows the configuration of a proximity wireless transfer system through an extremely low-power UWB communication scheme that utilizes electric field coupling.

FIG. 1 schematically shows the configuration of a proximity wireless transfer system through an extremely low-power UWB communication scheme that utilizes electric field coupling. In the drawing, coupling electrodes 14 and 24 for transmission/reception are respectively provided in a transmitter 10 and a receiver 20, and are disposed oppositely with a gap of about 3 cm, for example, between each other to enable electric field coupling. A transmission circuit section 11 on the transmitter 10 side generates a high-frequency transmission signal, such as a UWB signal, on the basis of transmission data in response to a transmission request from an upper-level application to propagate the generated signal from the transmission electrode 14 to the reception electrode 24 as an electric field signal. Then, a reception circuit section 21 on the receiver 20 side modulates and decodes the received high-frequency electric field signal to deliver the reproduced data to an upper-level application.

A communication scheme that uses a high-frequency wide band, such as UWB communication, achieves ultra-fast data transfer at about 100 Mbps in a short range. In the case where UWB communication is performed through electrostatic field coupling or induced electric field coupling rather than radiation electric field coupling, the electric field intensity is inversely proportional to the cube or square of the distance as discussed later. Thus, extremely low-power radio, for which no license from the radio station is necessary, may be used by suppressing the electric field intensity in a range of 3 meters from the wireless equipment to a predetermined level or lower. This allows construction of an inexpensive communication system. Since data communication is performed in a short range through an electric field coupling scheme, advantageously, reflected waves from reflective objects in the surroundings are so small as to cause little interference, and it is not necessary to consider hacking prevention or security of confidentiality on the transfer path.

Meanwhile, the propagation loss increases in accordance with the propagation distance with respect to the wavelength, and thus it is necessary to sufficiently suppress the propagation loss when a high-frequency signal is propagated through electric field coupling. In a communication scheme in which a high-frequency wide-band signal, such as a UWB signal, is transferred through electric field coupling, even a short communication range of about 3 cm is equivalent to about half the wavelength when a frequency in a 4 GHz band is used, and thus unignorable. In a high-frequency circuit, in particular, the issue of characteristic impedance is serious compared to a low-frequency circuit, and the influence of impedance mismatching is apparent at the coupling point between the respective electrodes of the transmitter and the receiver.

In communication that uses a frequency in a kHz or MHz band, the propagation loss in space is small. Therefore, desired data transfer may be performed even in the case where the transmitter and the receiver each include a coupler formed from only an electrode and their coupling portions simply operate as parallel plate capacitors. In contrast, in communication in which a high frequency in a GHz band is used and a signal is transferred over a distance that is unignorable with respect to the wavelength, the propagation loss in space is large. Therefore, it is necessary to suppress reflection of the transfer signal in order to improve the transfer efficiency. Even if the transfer path is adjusted to a predetermined characteristic impedance in each of the transmitter and the receiver, impedance matching may not be achieved at the coupling portions just by coupling the parallel plate capacitors. For example, it is assumed that the transfer path for a high-frequency electric field signal that connects between the transmission circuit section 11 and the transmission electrode 14 in the system shown in FIG. 1 is a coaxial line whose impedance is matched to 50Ω, for example. Then, if impedances at the coupling portions between the transmission electrode 14 and the reception electrode 24 are not matched, the electric field signal is reflected to cause a propagation loss and thus reduce the communication efficiency.

Figure 2:
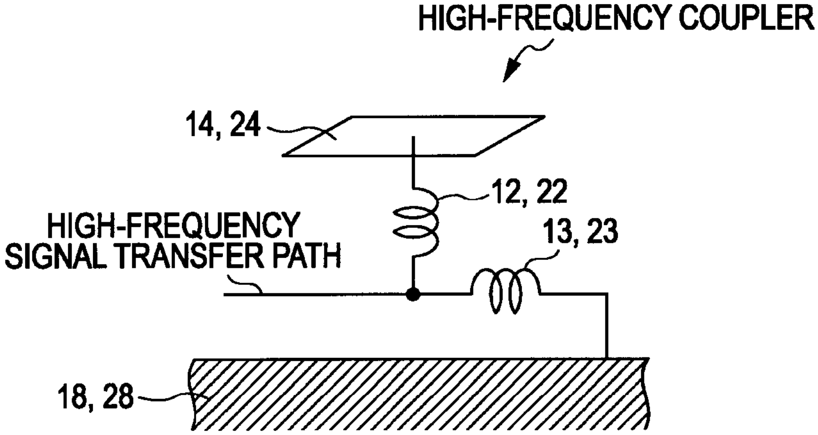
FIG. 2 shows the basic configuration of a high-frequency coupler disposed in each of a transmitter 10 and a receiver 20.

Accordingly, as shown in FIG. 2, each of the transmitter 10 and the receiver 20 is provided with a high-frequency coupler formed by loading a plate electrode 14, 24 and a resonance section, which is formed from a serial inductor 12, 22 and a parallel inductor 13, 23, on a high-frequency signal transfer path that connects between the transmission/reception circuit section 11, 21 and the coupling electrode 14, 24. The high-frequency signal transfer path may be formed of a coaxial cable, a microstrip line, a coplanar line, or the like. When such high-frequency couplers are disposed to face each other at an extremely short distance at which a quasi-electrostatic field is dominant, the coupling portions operate like a band-pass filter to transfer a high-frequency signal. Even at a distance that is unignorable with respect to the wavelength at which an induced electric field is dominant, a high-frequency signal may be transferred efficiently between the two high-frequency couplers via an induced electric field produced from an infinitesimal dipole formed by a charge and an image charge respectively accumulated in the coupling electrode and the ground.

If it is only intended to simply perform impedance matching between the electrodes of the transmitter 10 and the receiver 20, that is, at the coupling portions, in order to suppress reflected waves, it is possible to design the impedance at the coupling portions so as to be continuous even if each coupler has a simple structure in which the plate electrode 14, 24 and the serial inductor 12, 24 are connected in series on the high-frequency signal transfer path. However, the characteristic impedance does not vary between the front and the back of the coupling portions, and thus the magnitude of the current also does not vary. In contrast, by providing the parallel inductor 13, 23, a greater charge may be fed to the coupling electrode 14 to produce stronger electric field coupling between the coupling electrodes 14, 24. Also, when a strong electric field is induced in the vicinity of the surface of the coupling electrode 14, the produced electric field propagates from the surface of the coupling electrode 14 as an electric field signal with vertical waves that oscillate in the traveling direction (in the direction of the infinitesimal dipole, as discussed later). The waves of the electric field enable propagation of the electric field signal even in the case where the distance (phase length) between the coupling electrodes 14, 24 is relatively long.

Thus, in the proximity wireless transfer system through an extremely low-power UWB communication scheme that utilizes electric field coupling, each high-frequency coupler is demanded to satisfy the following conditions.

(1) A coupling electrode for electric field coupling is provided opposite the ground and away in height from the ground by a distance that is ignorable with respect to the wavelength of the high-frequency signal.

(2) A resonance section (a parallel inductor or a stub) for stronger electric field coupling is provided.

(3) The series and parallel inductors and the constant of the capacitor formed by the coupling electrodes or the length of the stubs are set such that impedance matching is achieved in a frequency band used in communication when the coupling electrodes are placed to face each other.

In the system shown in FIG. 1, when the respective coupling electrodes 14, 24 of the transmitter 10 and the receiver 20 are disposed oppositely an appropriate distance away from each other, the two high-frequency couplers operate as a band-pass filter that allows an electric field signal in a desired high-frequency band to pass through. Also, each single high-frequency coupler acts as an impedance conversion circuit that amplifies a current to cause a current with a large amplitude to flow into the coupling electrode. On the other hand, when the high-frequency coupler is placed individually in a free space, the input impedance of the high-frequency coupler does not match the characteristic impedance of the high-frequency signal transfer path. Thus, a signal entering the high-frequency signal transfer path is reflected within the high-frequency coupler and not radiated to the outside, and therefore does not affect other communication systems in the neighborhood. That is, the high-frequency coupler on the transmitter side does not keep emitting radio waves as an antenna does when a communication partner is not present, but achieves impedance matching to transfer a high-frequency electric field signal only when a communication partner comes close to the high-frequency coupler.

Figure 3:
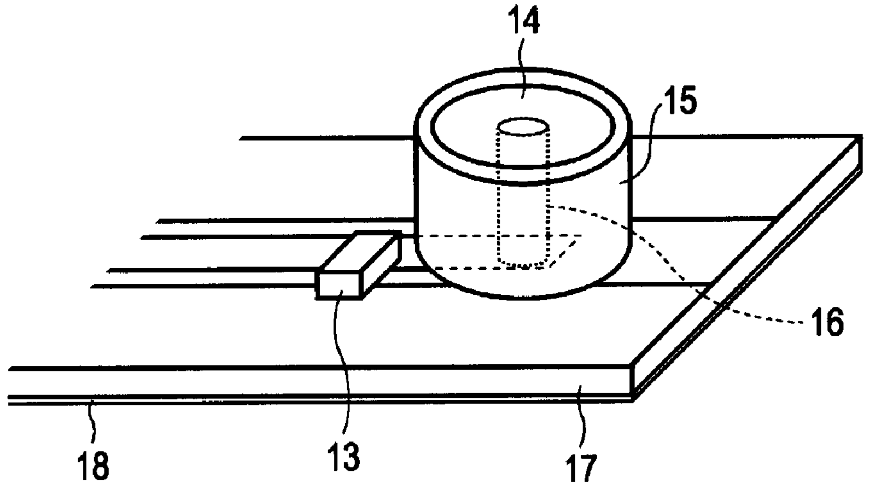
FIG. 3 shows an exemplary implementation of the high-frequency coupler shown in FIG. 2.

FIG. 3 shows an exemplary implementation of the high-frequency coupler shown in FIG. 2. The high-frequency coupler in each of the transmitter 10 and the receiver 20 may be configured in the same way. As shown in the drawing, the coupling electrode 14 is disposed on the upper surface of a spacer 15 formed from a cylindrical dielectric, and electrically connected to the high-frequency signal transfer path on a printed circuit board 17 through a through hole 16 penetrating the inside of the spacer 15.

For example, the through hole 16 is formed in the cylindrical dielectric with a predetermined height. Thereafter, the through hole 16 is filled with a conductor, and a conductor pattern that will serve as the coupling electrode 14 is evaporated on the upper end surface of the cylindrical dielectric through a plating technique, for example. A wiring pattern that will serve as the high-frequency transfer line is formed on the printed circuit board 17. Then, the spacer 15 is installed on the printed circuit board 17 by reflow soldering or the like to produce the high-frequency coupler.

By appropriately adjusting the height from the circuit mounting surface of the printed circuit board 17 to the coupling electrode 14, that is, the length (phase length) of the through hole 16, in accordance with the wavelength of use, the through hole 16 may be provided with an inductance to replace the serial inductor 12 shown in FIG. 12. The high-frequency signal transfer path is connected to a ground 18 via the chip-like parallel inductor 13.

Now, an electromagnetic field produced in the coupling electrode 14 on the transmitter 10 side is considered.

As shown in FIGS. 1 and 2, the coupling electrode 14 is connected to an end of the high-frequency signal transfer path to receive a high-frequency signal output from the transmission circuit section 11 and accumulate a charge. At this time, the current flowing into the coupling electrode 14 via the transfer path is amplified by a resonance effect of the resonance section formed from the serial inductor 12 and the parallel inductor 13 to accumulate a greater charge.

The ground 18 is disposed opposite the coupling electrode 14 and away in height (phase length) from the coupling electrode 14 by a distance that is ignorable with respect to the wavelength of the high-frequency signal. Then, when a charge is accumulated in the coupling electrode 14 as discussed above, an image charge is accumulated in the ground 18. As disclosed in "Electromagnetism" by Tadashi Mizoguchi (Shokabo Publishing Co., Ltd., pp. 54-57), for example, and thus known in the art, when a point charge Q is provided outside a plate conductor, an image charge −Q (which is a virtual charge with replaced surface charge distribution) is disposed inside the plate conductor.

As a result, an infinitesimal dipole is formed from a line segment connecting between the center of the charge accumulated in the coupling electrode 14 and the center of the image charge accumulated in the ground 18. Strictly speaking, each of the charge Q and the image charge −Q has a volume, and the infinitesimal dipole is formed to connect between the center of the charge and the center of the image charge. The term "infinitesimal dipole" as used herein refers to "an electric dipole whose charges are positioned away from each other by a very short distance". The "infinitesimal dipole" is also disclosed in "Antenna and Radio-Wave Propagation" by Yasuto Mushiake (Corona Publishing Co., Ltd., pp. 16-18), for example. The infinitesimal dipole produces a horizontal wave component $E_\theta$ of the electric field, a vertical wave component $E_R$ of the electric field, and a magnetic field $H_\phi$ around the infinitesimal dipole.

Figure 4:
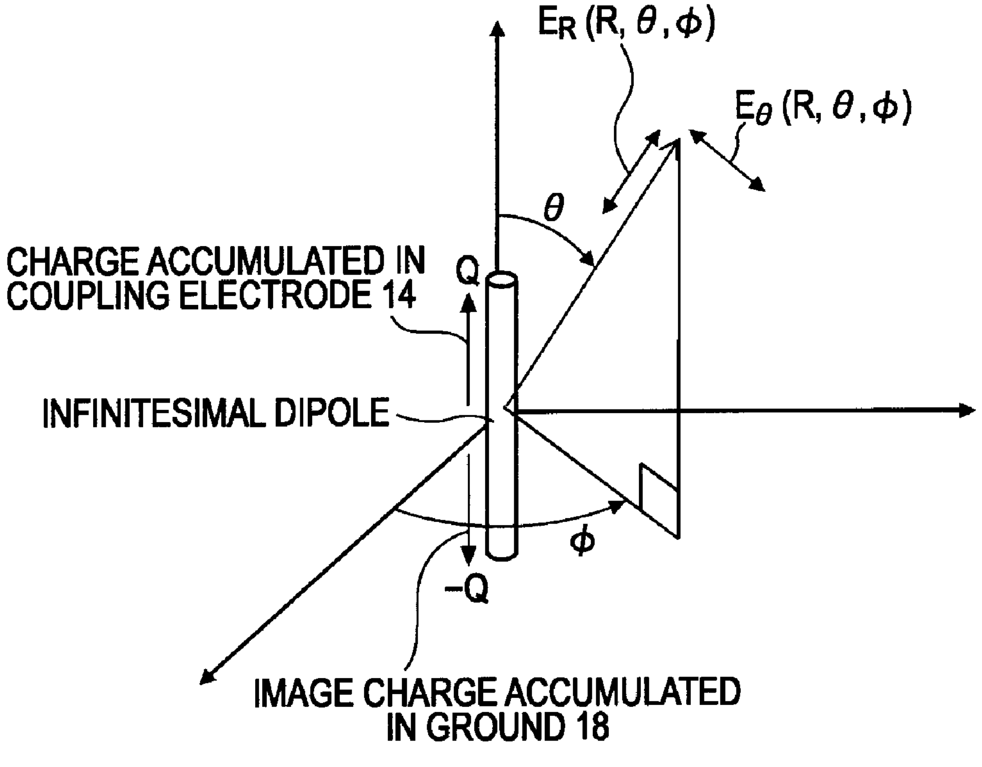
FIG. 4 shows an electromagnetic field produced by an infinitesimal dipole.
Figure 5:
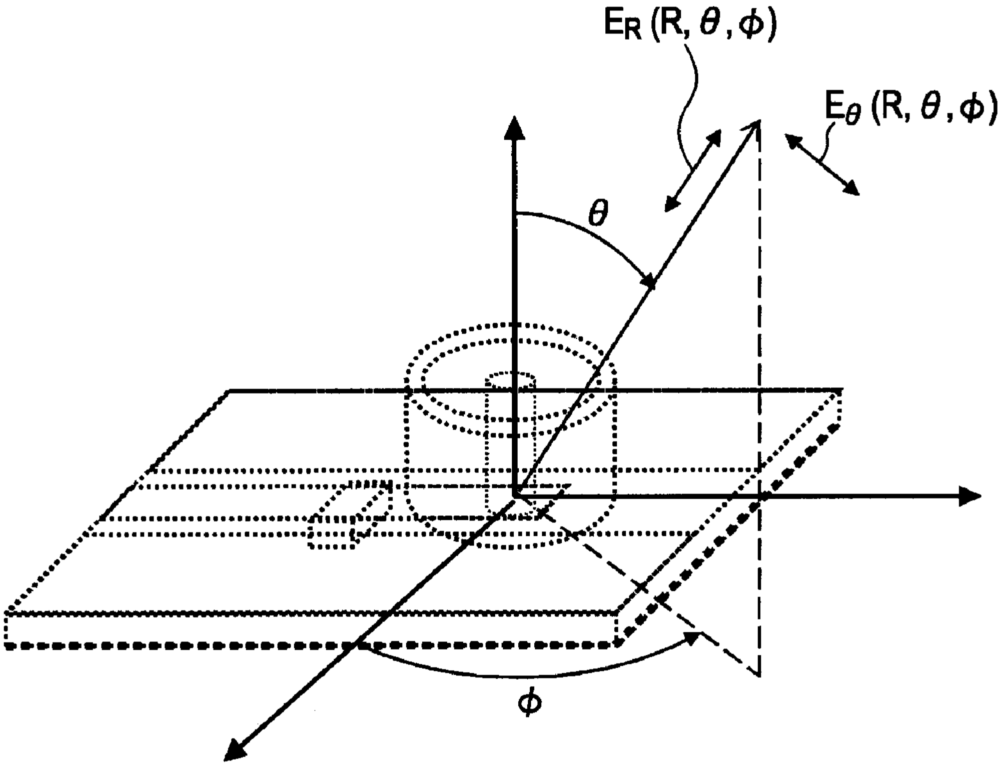
FIG. 5 shows the electromagnetic field shown in FIG. 4 as mapped on a coupling electrode.

FIG. 4 shows an electromagnetic field produced by the infinitesimal dipole. FIG. 5 shows how the electromagnetic field is mapped on the coupling electrode. As shown in the drawings, the horizontal wave component $E_\theta$ of the electric field oscillates in a direction perpendicular to the propagation direction, and the vertical wave component $E_R$ of the electric field oscillates in a direction parallel to the propagation direction. Also, the magnetic field $H_\phi$ is produced around the infinitesimal dipole. Formulas (1) to (3) below represent the electromagnetic field produced by the infinitesimal dipole. In the formulas, components inversely proportional to the cube of a distance R correspond to the electrostatic field, components inversely proportional to the square of the distance R correspond to the induced electric field, and components inversely proportional to the distance R correspond to the radiation electric field.

$$E_\theta = \frac{pe^{-jkR}}{4\pi\varepsilon}\left(\frac{1}{R^3} + \frac{jk}{R^2} - \frac{k^2}{R}\right)\sin\theta \tag{1}$$

$$E_R = \frac{pe^{-jkR}}{2\pi\varepsilon}\left(\frac{1}{R^3} + \frac{jk}{R^2}\right)\cos\theta \tag{2}$$

$$H_\phi = \frac{j\omega pe^{-jkR}}{4\pi}\left(\frac{1}{R^2} + \frac{jk}{R}\right)\sin\theta \tag{3}$$

In order to prevent the proximity wireless transfer system shown in FIG. 1 from radiating waves disturbing other systems in the surroundings, it is considered to be preferable to utilize the vertical wave component $E_R$ which contains no components of the radiation electric field while suppressing the horizontal wave component $E_\theta$ which contains components of the radiation electric field. This is because the vertical wave component $E_R$ of the electric field contains no components of the radiation electric field component which are inversely proportional to the distance (that is, which has a low range attenuation), while the horizontal wave component $E_\theta$ contains components of the radiation electric field as seen from Formulas (1) and (2) above.

Figure 6:
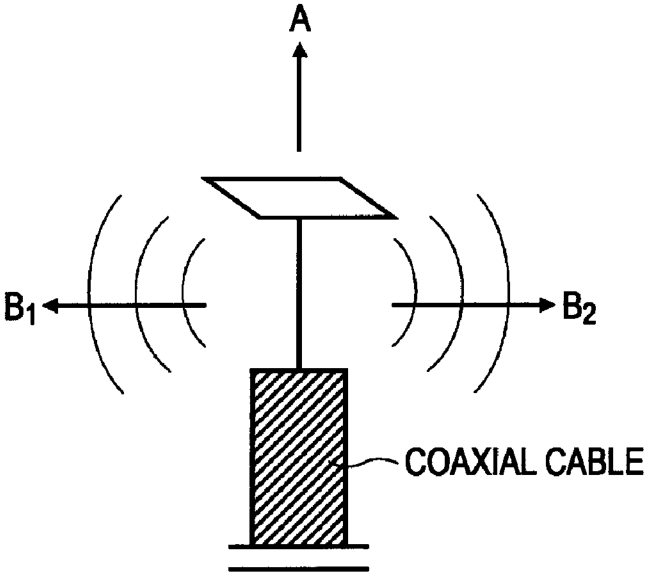
FIG. 6 shows an exemplary configuration of a capacitively loaded antenna.

In order to produce no horizontal wave component $E_\theta$ of the electric field, first, it is necessary that the high-frequency coupler should not operate as an antenna. At a first sight, the high-frequency coupler shown in FIG. 2 is similar in structure to a "capacitively loaded" antenna in which a metal member is attached to an end of an antenna element to provide a capacitance in order to reduce the height of the antenna. Thus, it is necessary to prevent the high-frequency coupler from operating as a capacitively loaded antenna. FIG. 6 shows an exemplary configuration of a capacitively loaded antenna. In the drawing, the vertical wave component $E_R$ of the electric field is mainly produced in the direction of the arrow A, and the horizontal wave component $E_\theta$ of the electric field is produced in the direction of the arrows B1 and B2.

In the coupling electrode with the exemplary configuration shown in FIG. 3, the dielectric 15 and the through hole 16 serve to both avoid coupling between the coupling electrode 14 and the ground 18 and form the serial inductor 12. Electric field coupling with the high-frequency coupler on the receiver side is secured while avoiding electric field coupling between the ground 18 and the electrode 14 by forming the serial inductor 12 with the electrode 14 positioned at a sufficient height from the circuit mounting surface of the printed circuit board 17. It should be noted, however, that if the height of the dielectric 15 is so large, that is, the distance from the circuit mounting surface of the printed circuit board 17 to the electrode 14 is so long as to be unignorable with respect to the wavelength of use, the high-frequency coupler acts as a capacitively loaded antenna to produce the horizontal wave component $E_\theta$ in the direction of the arrows B1 and B2 shown in FIG. 6. Hence, it is necessary that the height of the dielectric 15 should be large enough to obtain characteristics for serving as a high-frequency coupler while avoiding coupling between the electrode 14 and the ground 18 and to form the serial inductor 12 which is necessary to act as an impedance matching circuit, and be short enough to suppress radiation of unnecessary radio waves $E_\theta$ due to the current flowing through the serial inductor 12.

Meanwhile, it is seen from Formula (2) above that the vertical wave component $E_R$ becomes maximum when it forms an angle θ of 0 degrees with the direction of the infinitesimal dipole. Thus, in order to perform contactless communication by efficiently utilizing the vertical wave component $E_R$ of the electric field, it is preferable to transfer a high-frequency electric field signal with the high-frequency coupler on the receiver side disposed oppositely so as to form an angle θ of substantially 0 degrees with the direction of the infinitesimal dipole.

The resonance section formed from the serial inductor 12 and the parallel inductor 13 may increase the current of the high-frequency signal flowing from the resonance section into the coupling electrode 14. As a result, it is possible to increase the moment of the infinitesimal dipole formed by the charge accumulated in the coupling electrode 14 and the image charge accumulated in the ground, and to efficiently discharge a high-frequency electric field signal formed from the vertical wave component $E_R$ in a propagation direction that forms an angle θ of substantially 0 degrees with the direction of the infinitesimal dipole.

A cradle may be mentioned as an instrument that provides a proximity wireless transfer function to existing information devices such as personal computers. For example, connecting a cradle to the main body of an information device through a USB (Universal Serial Bus) enables data transmission and reception through proximity wireless transfer between the information device and a cellular phone or a digital camera incorporating a proximity wireless transfer function.

Figure 7:
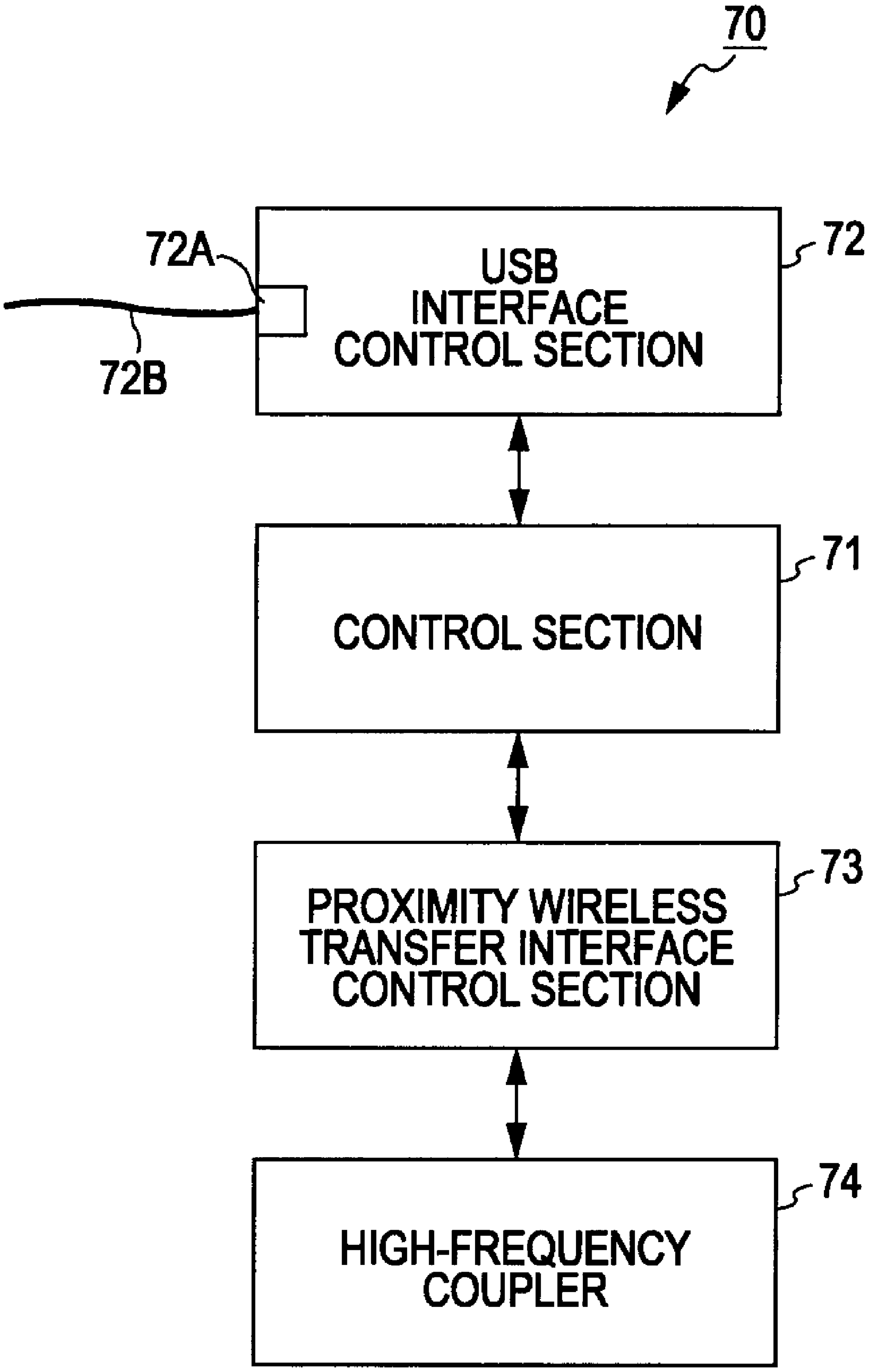
FIG. 7 shows an exemplary internal configuration of a cradle that provides a proximity wireless transfer function.
Figure 8A:
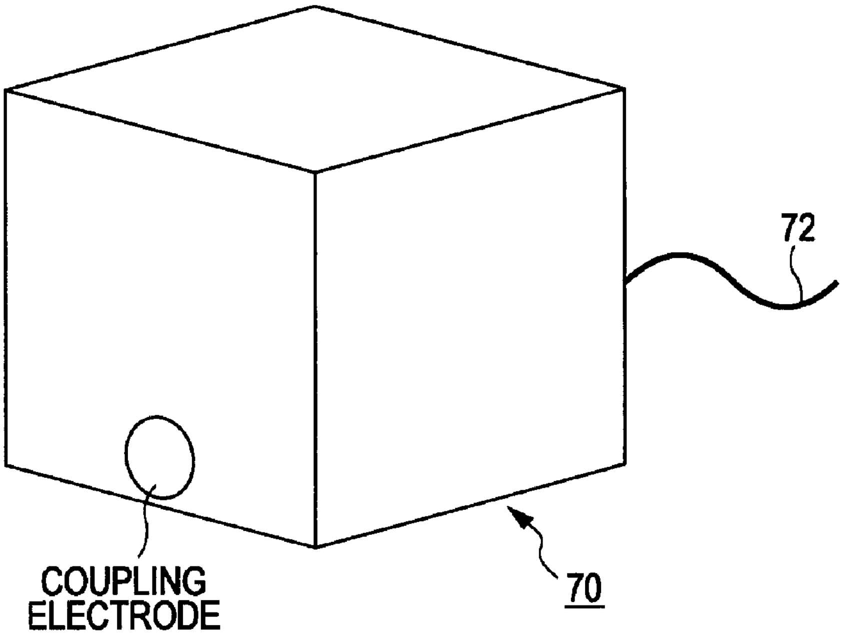
FIG. 8A shows how the position of the coupling electrode changes in accordance with variations in placement posture of a cubic cradle 70.
Figure 8B:
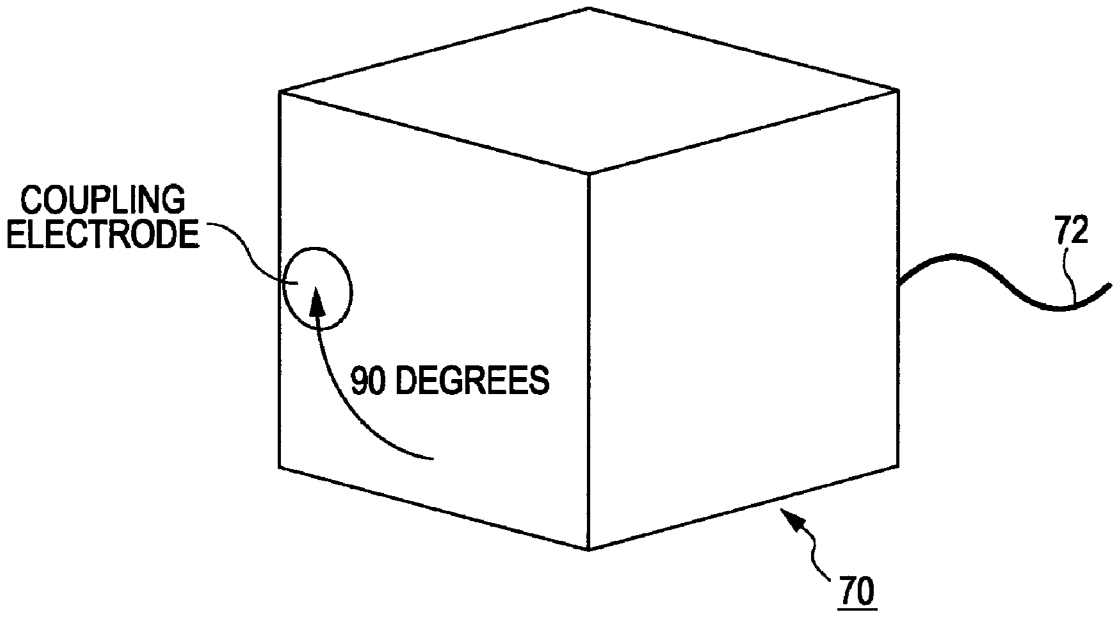
FIG. 8B shows how the position of the coupling electrode changes in accordance with variations in placement posture of the cubic cradle 70.
Figure 8C:
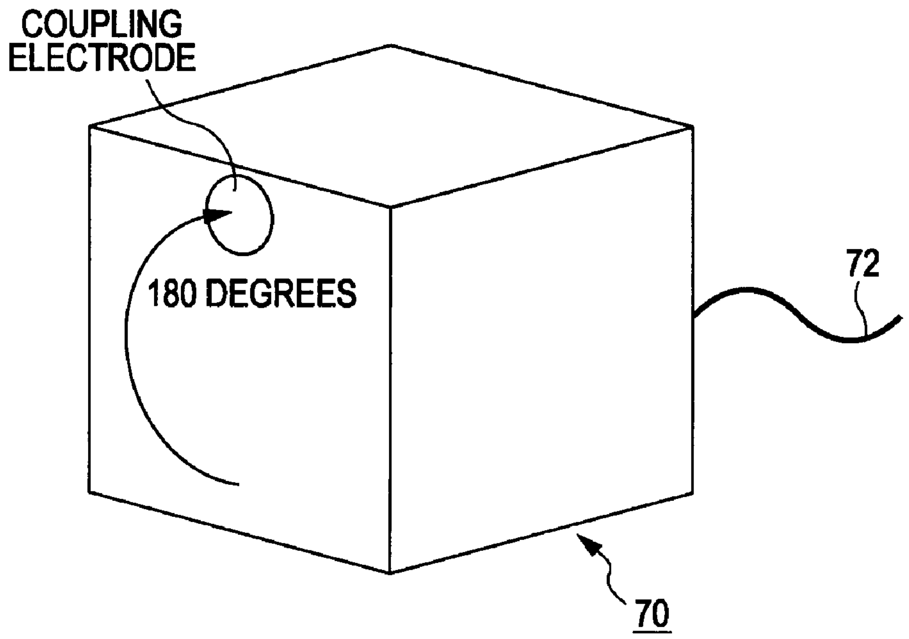
FIG. 8C shows how the position of the coupling electrode changes in accordance with variations in placement posture of the cubic cradle 70.
Figure 8D:
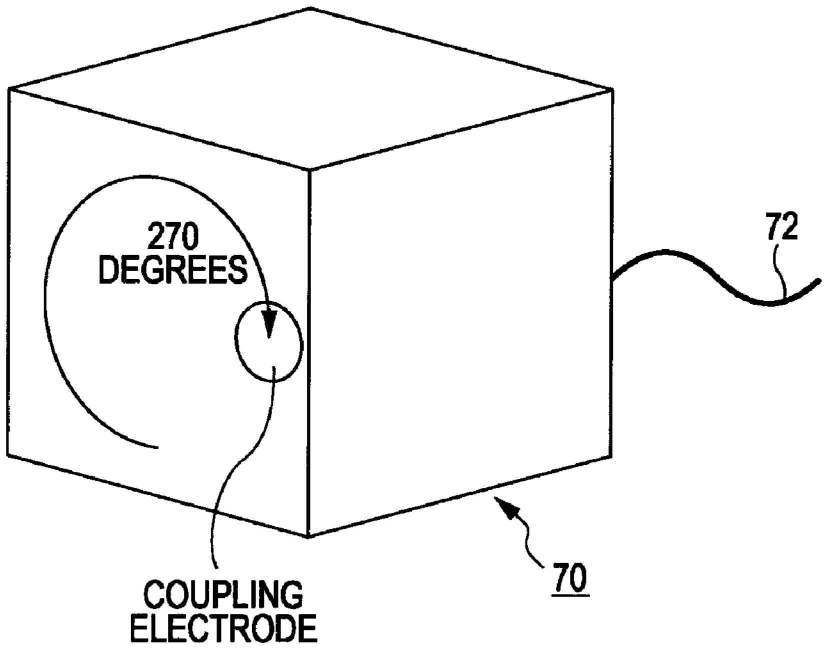
FIG. 8D shows how the position of the coupling electrode changes in accordance with variations in placement posture of the cubic cradle 70.

FIG. 7 shows an exemplary internal configuration of a cradle that provides a proximity wireless transfer function. A cradle 70 in the drawing includes a control section 71, a USB interface control section 72, a proximity wireless transfer interface control section 73, and a high-frequency coupler 74.

The control section 71 comprehensively controls internal operation of the cradle 70.

The USB interface control section 72 functions as a USB device for a USB host such as a personal computer (not shown) connected through a USB via a USB cable 72B attached to a USB terminal 72A. The USB interface control section 72 controls operation for transmitting and receiving data in accordance with a USB protocol.

The high-frequency coupler 74 is formed of the coupling electrode 14, 24, the ground 18, 28, and the resonance section formed from the serial inductor 12, 22 and the parallel inductor 13, 23 as shown in FIGS. 1 and 2. The high-frequency coupler 74 allows signal transfer utilizing electric field coupling with a high-frequency coupler (not shown) in a communication partner such as a cellular phone or a digital camera. The proximity wireless transfer interface control section 73 serves as the transmission/reception circuit section 11, 21 of the transmitter/receiver 10, 20 shown in FIGS. 1 and 2. The proximity wireless transfer interface control section 73 controls data transmission/reception operation in proximity wireless transfer.

In order to reduce the number of cradles 70 in home, it is preferable to introduce the concept of Universal Design and provide a cradle common to a plurality of models, rather than providing a cradle dedicated to each model. To establish contactless connection between the cradle 70 and portable information devices, the cradle 70 is not configured to engage with only portable information devices whose main body has a specified shape. Rather, a data reading surface may be provided in one end surface of the main body of the cradle 70, for example, to perform proximity wireless transfer with a portable information device placed at the side of the reading surface (without mechanical engagement). Preferably, the communication quality is substantially uniform within the reading surface, that is, the same communication quality is obtained by approximating a portable information device to any part of the reading surface.

According to proximity wireless transfer that utilizes extremely low-power UWB, the high-frequency coupler 74 has a communication range of about 2 to 3 cm, for example. Since the coupling electrode does not have polarization characteristics, the high-frequency coupler 74 has a communicable range substantially in the shape of a hemispherical dome having substantially the same extension in the vertical direction and in the horizontal direction.

Meanwhile, portable information devices such as cellular phones and digital cameras are varied in design and operability between models. Thus, the shape of the devices and the installation position of the high-frequency coupler within the devices are not fixed. Therefore, even if a cellular phone is placed on a desktop (or on the floor) in the same posture and a cradle is placed adjacent to the cellular phone, the coupling electrode of the high-frequency coupler may not face the reading surface of the cradle appropriately. For example, assuming that the height and the thickness of the portable information device are respectively about 5 cm and 1 cm, the difference in height of the coupling electrode due to the difference in design among models or the difference in posture of the device placed on a desktop may be as large as about 5 cm. That is, variations in height of the coupling electrode according to the placement posture of the portable information device may exceed the communication range supported by the proximity wireless transfer technology.

Therefore, it is necessary that the reading surface of the cradle should secure a horizontal communicable range that tolerates variations in height of the coupling electrode according to the placement posture of a portable information device serving as the communication partner.

One approach for expanding the communicable range of the reading surface of the cradle is to dispose the coupling electrode (or the communicable range of 2 to 3 cm provided by the coupling electrode) at a position offset from the center of the reading surface in order to utilize the effect of changes in position of the coupling electrode within the reading surface according to changes in placement posture of the main body of the cradle 70.

For example, in the case where the cradle 70 has a cubic main body as shown in FIGS. 8A to 8D, the cradle 70 may assume four placement postures by rotating the cradle 70 by 0 degrees, 90 degrees, 180 degrees, and 270 degrees with the reading surface facing forward as shown in FIGS. 8A to 8D. Then, the coupling electrode and the communicable range naturally move in accordance with variations in placement posture.

Figure 9:
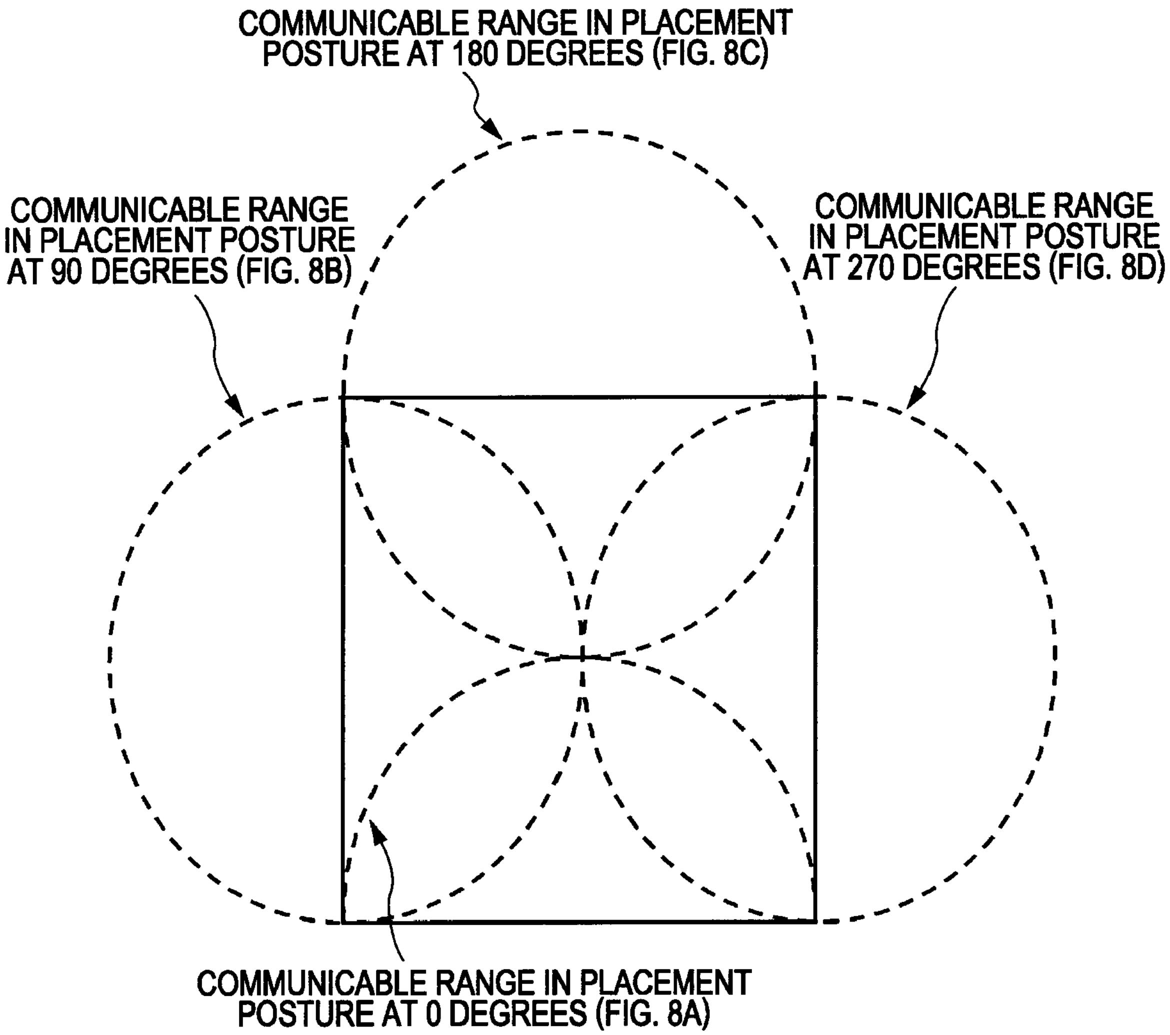
FIG. 9 shows exemplary communicable ranges of a reading surface, each side of which is 5 to 6 cm, of the main body of the cubic cradle 70 in respective placement postures.
Figure 10A:
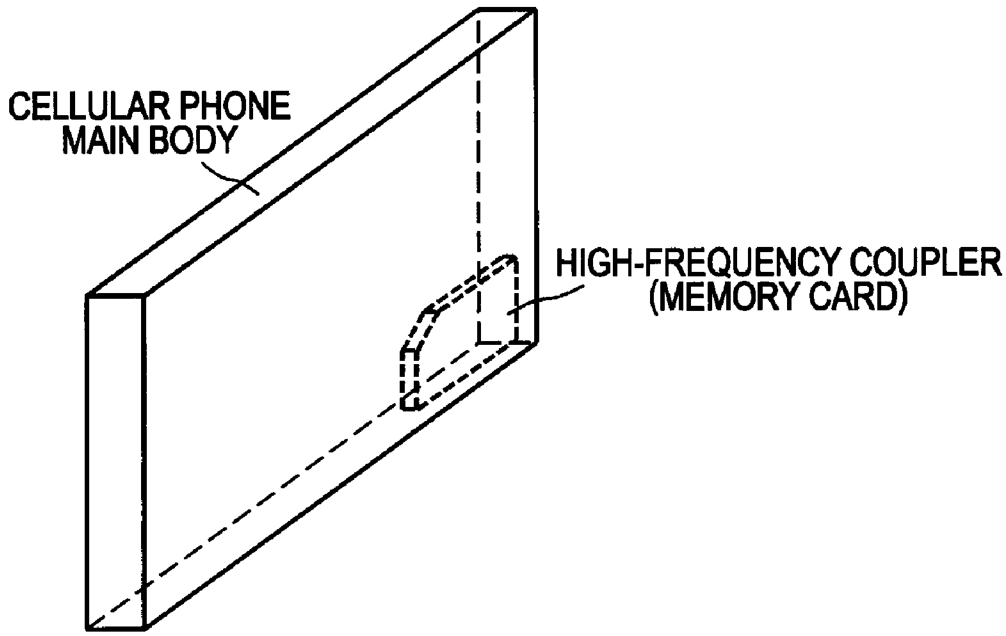
FIG. 10A illustrates the difference in installation position of the high-frequency coupler among models of portable information devices.
Figure 10B:
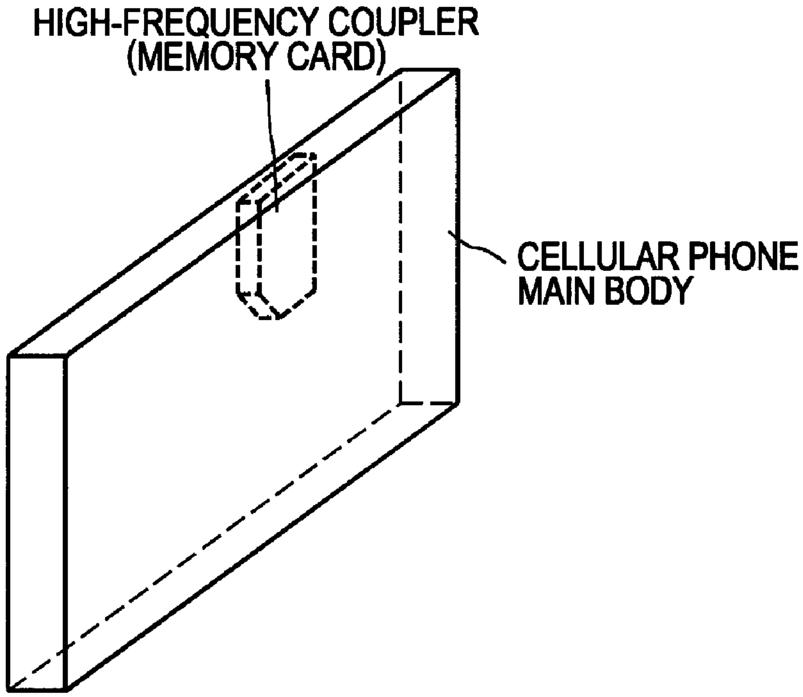
FIG. 10B illustrates the difference in installation position of the high-frequency coupler among models of portable information devices.

FIG. 9 shows exemplary communicable ranges of the reading surface, each side of which is 5 to 6 cm, of the main body of the cubic cradle 70 in the respective placement postures. It is understood that the communicable range may be expanded over the entire reading surface by moving the communicable range in accordance with variations in placement posture although the communicable range of the coupling electrode is 2 to 3 cm. The communicable range may be expanded to a maximum of three times in the vertical direction from the horizontal surface on which the cradle 70 is placed.

The present invention is not limited to the cradle 70 with a cubic main body. Rather, the main body of the cradle 70 may have any other shape as long as a plurality of placement postures are provided. In any case, the communicable range of the reading surface may be expanded by disposing the coupling electrode in the reading surface at a position offset from the center of the reading surface in order to utilize the effect of changes in position of the coupling electrode within the reading surface according to changes in placement posture of the main body of the cradle 70.

The present application contains subject matter related to that disclosed in Japanese Priority Patent Application JP 2009-102507 filed in the Japan Patent Office on Apr. 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:

a communication circuit section that processes a high-frequency signal for transferring data;

a transfer path for the high-frequency signal connected to the communication circuit section;

a ground;

a coupling electrode supported opposite the ground and away in height from the ground by a distance that is ignorable with respect to a wavelength of the high-frequency signal;

a resonance section that increases a current flowing into the coupling electrode via the transfer path; and a main body housing that assumes a plurality of placement postures and that houses the respective components, one end surface of the main body housing serving as a reading surface in which the coupling electrode is disposed at a position offset from a center of the reading surface, wherein an infinitesimal dipole is formed from a line segment connecting between a center of a charge accumulated in the coupling electrode and a center of an image charge accumulated in the ground, and the high-frequency signal is transferred toward a communication partner disposed oppositely so as to form an angle of substantially 0 degrees with a direction of the infinitesimal dipole.

2. The communication apparatus according to claim 1, further comprising:

a communication interface control section that performs data transmission and reception with an external device in accordance with a predetermined communication protocol; and a control section that controls operation of the entire apparatus which includes communication operation performed by the communication circuit section and the communication interface control section.

3. The communication apparatus according to claim 1, wherein the housing substantially has a shape of a cube, one end surface of the cube serves as a reading surface in which the coupling electrode is disposed at a position offset from a center of the reading surface, and the cube assumes different placement postures by changing a ground contact surface of the cube.

* * * * *